US005229139A

United States Patent [19]

Haupt

[11] Patent Number: 5,229,139

[45] Date of Patent: Jul. 20, 1993

[54] CONTINUOUSLY OPERATING PRESS

[75] Inventor: Ulrich Haupt, Wennigsen, Fed. Rep. of Germany

[73] Assignee: Bison-Werke Baehre & Greten GmbH & Co. KG, Springe, Fed. Rep. of Germany

[21] Appl. No.: 809,659

[22] Filed: Dec. 18, 1991

[30] Foreign Application Priority Data

Dec. 21, 1990 [EP] European Pat. Off. ........ 90125113.2

[51] Int. Cl.[5] .............................................. B29C 43/48

[52] U.S. Cl. .................................... 425/107; 100/151; 156/555; 156/583.5; 425/371

[58] Field of Search ........................... 100/93 RP, 151; 156/555, 583.1, 583.5; 425/101, 107, 371

[56] References Cited

U.S. PATENT DOCUMENTS

| | | | |
|---|---|---|---|
| 2,909,804 | 10/1959 | Means | 425/107 |
| 3,521,552 | 7/1970 | Knapp | 425/101 |
| 3,532,050 | 10/1970 | Carlsmith | 100/151 |
| 4,253,391 | 3/1981 | Held | 156/555 |
| 4,365,548 | 12/1982 | Pankoke | 156/583.5 |
| 4,419,062 | 12/1983 | DeMets | 425/101 |
| 4,420,299 | 12/1983 | DeMets | 425/101 |
| 4,565,509 | 1/1986 | DeMets | 425/101 |
| 4,632,722 | 12/1986 | Pankoke | 156/555 |
| 4,665,818 | 5/1987 | Held | 156/583.5 |
| 4,850,848 | 7/1989 | Greten et al. | 425/371 |

FOREIGN PATENT DOCUMENTS

| | | | |
|---|---|---|---|
| 3914109 | 10/1990 | Fed. Rep. of Germany | 425/107 |

*Primary Examiner*—Scott Bushey
*Attorney, Agent, or Firm*—Townsend and Townsend Khourie and Crew

[57] ABSTRACT

A lubrication system for a continuously operating press for the pressing of a multi-ply board web (119) of pre-manufactured material has a press gap defined between upper and lower runs of endless recirculating steel press bands (105). A slide coating (101) which extends over the width of the press zone is provided with grooves. Each press band (105) slides by means of a lubricant which is supplied into the slide coating via supply lines and is led away through discharge openings. Several grooves (107, 108, 110, 111) for the swirling of the lubricant are provided for the press band (105) at least in the two outer longitudinal edge regions of the slide coating.

6 Claims, 3 Drawing Sheets

CONTINUOUSLY OPERATING PRESS

I. BACKGROUND OF THE INVENTION

A. Field of Invention

Figure 1:
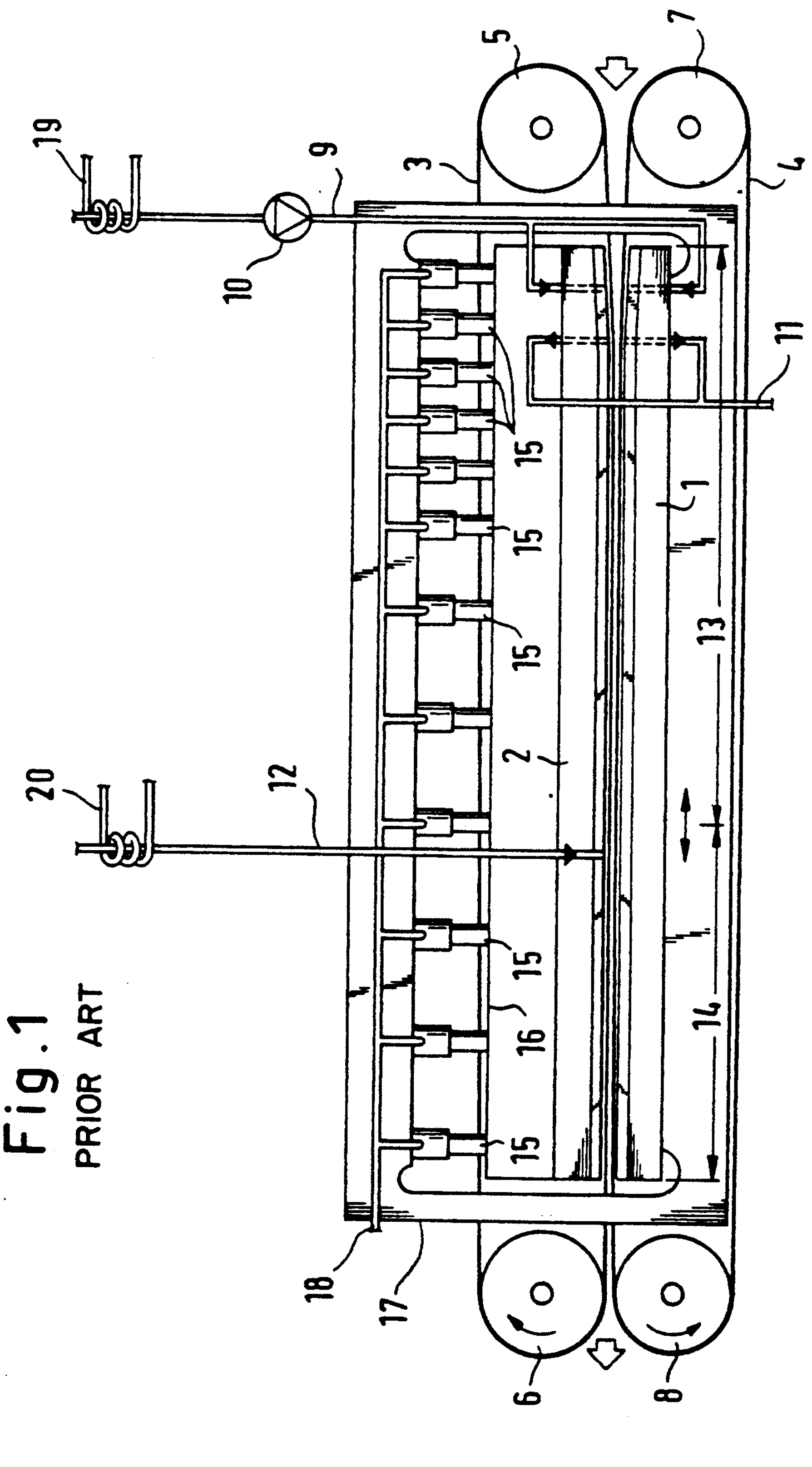
Fig. 1 PRIOR ART

The invention relates to a continuously operating press, preferably for the manufacture and/or printing, lamination or the like of a one or multiple layer board web of pre-manufactured material and/or raw material. Such presses are particularly used for the manufacture of particleboard, fiberboard, hardboard or the like, and indeed from a mat comprising particles containing lignocellulose and/or cellulose such as wood chips, wood fibers or the like and at least one dispersed binder. The mat runs in the transport direction between the upper run of a lower endless press band and the lower run of an upper endless press band which are preferably of steel and which circulate at a predetermined speed. A slide coating with grooves is provided on upper and lower abutments or supports and extends over the entire width of the press zone. The press zone comprises at least one main press zone and a calibration zone which follows the latter. In operation each press band slides over the slide coating by means of a lubricant which is supplied under pressure and is optionally heated or cooled. The lubricant is supplied via feed lines and supply openings in the slide coating, and is led away through discharge openings and also discharge lines which are connected thereto. The lubricant is supplied to the press anew in a circuit—optionally after being heated or cooled again. Each groove of the slide coating has only one opening, with one of the supply openings being provided in the one groove and one of the discharge openings being provided in the groove adjacent thereto, pressure control means for generating a counter-pressure are associated with each groove having a discharge opening or a supply opening.

B. Description of the Related Art

A press of the above described kind is known from U.S. Pat. No. 4,565,509. This latter U.S. Patent also refers to an earlier U.S. Pat. No. 4,420,299 which illustrates a typical continuously operating press with recirculating steel press bands. The contents of these two U.S. specifications are incorporated herein by reference.

In the press known from U.S. Pat. No. 4,565,509 the pressure control means for the lubricant for generating a counter-pressure in the working gap of the press (which pressure control means are associated with each groove of the slide coating having a discharge opening or a supply opening), ensure that the surface forces acting on the press band and on the slide coating are more uniformly carried by the lubricant. This results in an extremely low coefficient of friction and a correspondingly uniform heating or cooling distribution of the lubricant which is an important factor in determining the quality of the pressed material. A further determining factor for the quality is moreover the maintenance of a constant thickness and speed of the lubricant pressure film. This requirement cannot be straightforwardly and sufficiently satisfied in practice for the most stringent demands, even when the pressure control means for the lubricant are ideally adjusted for the generation of a counter-pressure in the working gap of the press.

II. SUMMARY OF THE INVENTION

The object of the invention is to provide a press of the initially named kind which maintains stable pressure, and temperature in the working gap of the press for long term operation with the smallest possible constructional complexity and expense.

To satisfy this object the invention provides;

a) several unconnected grooves for swirling of the lubricant are provided in at least the two outer longitudinal edge regions of the slide coating for the press band and extend parallel to the press band running direction, and b) narrow surfaces which bound the width of the material to be pressed lie at least substantially in front of, i.e. inside, the outer longitudinal edge regions of the slide coating for the press band which contain the said grooves.

The grooves suprisingly simple designwise, and can thus be realised with extremely favourable cost, prevents a sudden pressure drop of the lubricant relative to the atmospheric pressure at the edges of the slide coating. This is achieved in that the energy of the lubricant working pressure, which is necessary for the material to be pressed in accordance with the arrangement feature b) of the solution of the invention, is, as it were, very rapidly destroyed by mutually graduated eddies in the lubricant grooves which at least lie in the longitudinal edge regions of the slide coating (feature a) of the solution of the invention). As a result of this both foaming of the lubricant, such as oil, and escape of air from the oil as well as a swirling or intensive mixing of the oil with the environmental air is reliably avoided. If this were not the case the lubricant would develop into a two-phase mixture which reduces the thermal transfer, leads to premature aging and has other disadvantages. In accordance with the fundamental recognition underlying the present invention these disadvantageous effects in conjunction with the pressure differences in the edge regions of the slide coating are regarded as the cause for the previous unstable pressure and temperature situation.

Various possibilities exist with respect to the geometrical shape of the grooves. Grooves which have a square, rectangular or trapezoidal cross-section are already effective and can be simply produced by a milling process. These grooves can also have an inclined position which, together with the breakaway edges of the grooves, increases the degree of turbulence (swirling). In addition inclined features of the groove walls are also advantageous, such as for example saw-toothed contours since these intensify the turbulence of the lubricant.

It has been shown that the formation and arrangement of the grooves for swirling the lubricant in the edge regions of the slide coating for the press band so permanently improve the seal in these regions that only little leakage lubricant arises which has to be returned in the circuit to the supply openings in the slide coating. The uniform thickness of the lubricant film and its constant thickness in the actual working gap of the press (feature b) of the solution of the invention is simultaneously particularly favourable. In this manner the slide coating is very carefully treated, the ability to keep the material to be pressed within tolerances is decisively increased and the working energy required for the recirculation of the press belts is reduced. Finally, the pressed material obtained in accordance with the invention has, in long term operation, always a continuous permanent high quality throughout.

Developments and further improvements of the invention are the subject of the subordinate claims.

III. BRIEF DESCRIPTION OF THE DRAWINGS

The description of an embodiment of the invention will follow with respect to the drawings in which are shown:

FIG. 1 a prior art arrangement in the form of the single figure of U.S. Pat. No. 4,850,848, FIG. 2 a schematic illustration of a section of part of a slide coating, in accordance with the present invention, FIG. 3 a schematic, partly broken away cross-section through the section of part of the slide coating of FIG. 2 and also showing the material to be pressed located on a press belt, FIG. 4 a view similar to FIG. 3 but to an enlarged scale and showing only part of the structure of FIG. 3 with a modified trapezoidal cross-sectional shape of the grooves in the slide coating, FIG. 5 a view similar to FIG. 4 but with a parallelogram-like shape of the grooves in the slide coating, and FIG. 6 a side view of the inlet end of a press showing a scraper mounted on the lower press platen.

IV. DESCRIPTION OF THE PREFERRED EMBODIMENTS

In accordance with the drawing of FIG. 1 the continuous press includes a stationary press table 1 and a vertically adjustable press platen 2 and also endless steel bands 3, 4 which are guided over deflection rollers 5, 6 and 7, 8 respectively and are moved with the same speed along the confronting surfaces of the press table 1 and the press platen 2. In order to make sliding of the steel bands 3, 4 along the press table (lower press platen 1) and along the upper press platen 2 possible, lubricant is supplied to these platens so that a full area slide film is formed. The extraction of the lubricating oil takes place via suitably provided openings in the press table 1 or in the press platen 2 and also at the edges of the press surfaces.

The supply of lubricant at the input side to the press takes place via at least one schematically illustrated line 9, and indeed under the action of a pump 10 which generates the hydrodynamic pressure required in the press zone 13.

The return of the lubricant oil from the press zone 13 takes place via a line 11 which is only schematically illustrated, with the lubricant oil preferably being guided in the circuit. Oil drained or extracted via the line 11 is returned to a sump (not shown) and ultimately to the pump 10 which draws oil from the sump, usually via a heat exchanger 19 which may be supplied with waste heat, e.g. from an ice making plant. Alternatively the heat exchanger can be positioned in the sump. The entire press zone 13 can be oil lubricated in accordance with this hydrodynamic pressure principle.

The calibration zone 14 then adjoins this press zone 13 and, as a double arrow indicates, the size of the press zone 13 and of the calibration zone 14 can be made variable in order to take into account the particular requirements for the product being manufactured.

In the calibration zone 14 the lubricant has essentially only static pressure and the lubricant oil required for this calibration zone can originate wholly or partly from the press zone 13 and be transferred into the calibration zone 14 in the form of towed oil, i.e. oil towed along by the endless bands.

It is however also possible to supply the calibration zone 14 via a conduit 12 with further lubricant oil, however not a lubricant oil which stands under a hydrodynamic pressure. A second heat exchanger 20 permits heating the hydrostatically provided lubricant in line 12, independently of any heating in the hydrodynamically provided lubricant in line 9 in the press zone 13. The heating of lubricant in line 12 by heat exchanger 20 may be required to minimise local temperature shock.

The provision of press zones which stand under hydrodynamic pressure and optionally under reduced hydrodynamic pressure and a press zone at the output side which stands under hydrostatic pressure also makes it possible to provide differentiated temperature loading of these individual zones by the supply of differentially heated or cooled lubricant oil. In this manner one can in turn meet the requirements for the particular product that is to be manufactured in the best possible manner by setting the respective pressure and temperature parameters along the length of the press.

Individual hydraulic Rams 15 are used to provide the actual working pressure of the press, i.e. to press the press platen 2 downwardly towards the fixed press platen 1. As can be seen the hydraulic rams 15 bear at their lower ends against a force transmitting rail 16 provided on and above the press platen 2 and with their other ends against a frame 17 which surrounds the two press platens 1 and 2. In practice a frame such as 17 is also provided on the other side of the endless bands, i.e. behind the frame 17 shown in the plane of the drawing and further rams are interposed between this further frame and a further rail member 16 on the platen 2. Hydraulic pressure is supplied to the rams via the duct 18. The duct 12 with the supplied lubricant under only static pressure can communicate directly with a body of lubricant held in a container with the level of lubricant in the container being kept constant by a float system, in similar manner to the float system of a carburetor or oil stove, so that a steady static head of pressure is present in the line 12 and thus in the press zone 14.

It will be noted that FIG. 1 is included to illustrate the general layout of a typical continuously operating press rather than to describe the present invention. This will be done in detail with respect to FIGS. 2 to 6 and the reference numerals used in these figures have been chosen starting with 101 for the slide coating, so as to clearly differentiate between the present invention and the prior art of FIG. 1.

Although in U.S. Pat. No. 4,850,848 (from which the description of FIG. 1 is taken) consciously avoids dynamic pressure in the calibration zone 14 it is within the scope of the present invention to provide either only static pressure lubricant in the calibration zone (as in U.S. Pat. No. 4,850,848) or alternatively to utilize dynamic pressure there in the same way as in the zone 13.

Figure 2:
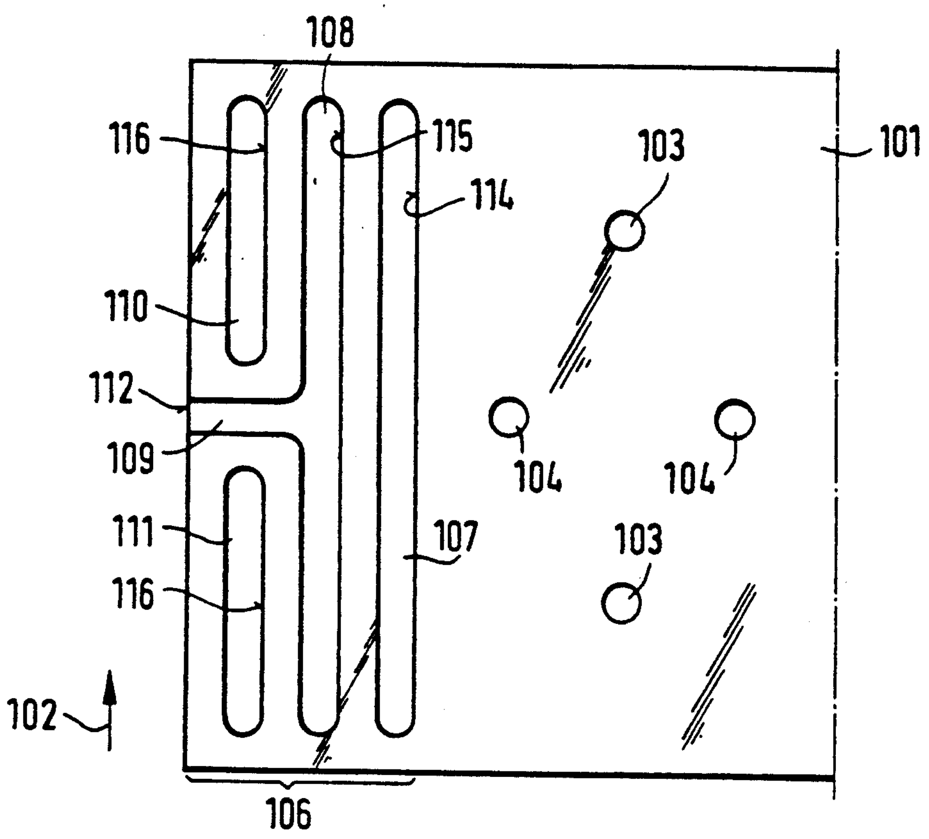

FIG. 2 shows a section of a region of a slide coating for a continuously operating press. The total slide coating of this press comprises a plurality of such slide coatings which are arranged bordering one another along the length of the press, i.e. the running direction thereof.

The running direction of the endless press belts which run into the press is characterised by an arrow with the reference numeral 102.

The slide coating 101 has supply openings 103 and discharge openings 104 for a liquid lubricant which in suitable grooves—see in this respect for example the grooves which can be seen in U.S. Pat. No. 4,565,509—bears the surface forces which act on the press band 105 shown in FIG. 3. The arrangement of openings 103 and 104 repeats across the width of the press until at the opposite side, i.e. at the right hand side (assuming that FIG. 2 shows the left hand side slide coating of the lower press platen), a symmetrical arrangement of grooves is provided corresponding to the edge region 106 of FIG. 2.

In accordance with the invention several grooves 107, 108, 110 and 111 for the swirling of the lubricant are provided in the edge region 106 of the slide coating 101 and extend parallel to one another and to the running direction 102. The outer grooves 110, 111 which are aligned with one another are less than half as long as the adjacent inner grooves 107, 108. A groove 109 which branches off perpendicular to the central groove 108 extends between the inner grooves 107, 108 and opens at the edge 112 of the slide coating 101. The groove 109 ensures an additional reduction in pressure of the lubricant swirled in the grooves 108 and 109 and thus ensures—see in this connection FIG. 3—that the edge section 113 of the press band 105 cannot lift from the slide coating.

Figure 3:
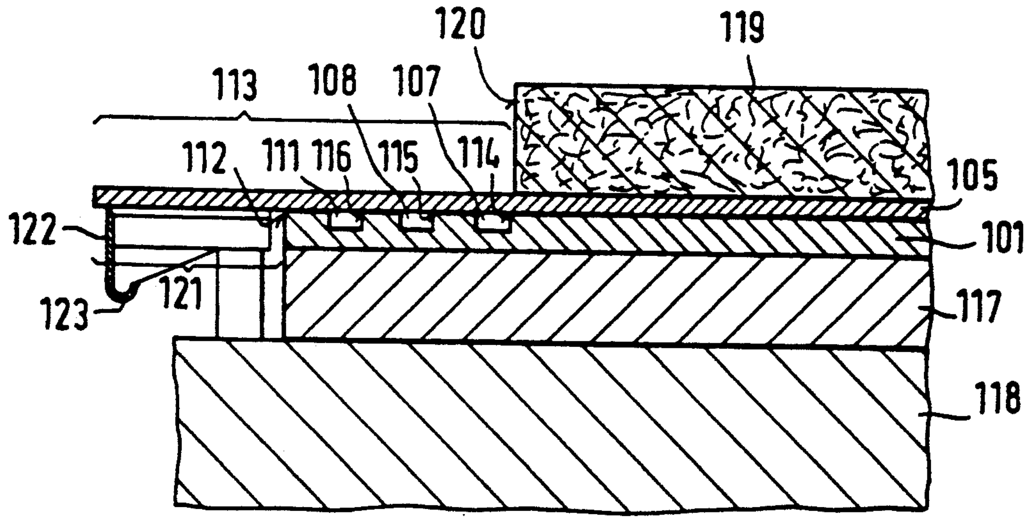

In the illustrated embodiment of FIG. 3 the grooves in the edge region of the slide coating 101 are of rectangular shape in cross-section and are provided with breakaway edges 114, 115 and 116, whereby a seal is provided in which the pressure of the lubricant can be reduced to atmospheric pressure.

In accordance with FIG. 3 the slide coating 101 is provided on an abutment or support plate 117 and the latter is secured to a press plate or platen 118 in a suitable manner, for example by means of screws.

During the operation of the press the press band 105 is drawn together with the mat of material 119 to be pressed over the slide coating 101 (only the left hand side portion of the mat is shown). During this a uniform, full area and pressure fluid controlled lubricant layer of a constant thickness and speed forms between the press band 105 and the slide coating 101 right up to the breakaway edge 114 of the groove 107 and this simultaneously ensures uniform heating up of the press band 105 and of the material 119 to be pressed and almost entirely precludes friction between the slide coating 101 and the press band 105. The narrow edge surface 120 of the material to be pressed is aligned with the breakaway edge 114 of the groove 107. A single and entirely simple scraper 122, e.g. with an oil collecting channel 123 (see also FIG. 6), serves to remove the oil which adheres to the lower surface of the edge section 121 of the press band 105.

It lies within the scope of the invention to provide simple scrapers such as 122 in the entry and/or exit from the press on the press band 105, and indeed transverse to the transport direction 102 of the press band 105. Accordingly, the grooves 107 to 111 of the slide coating 101 for the swirling of the lubricant are then arranged in this zone or in these zones of the press, likewise transverse to the transport direction of the press band 105.

Figure 4:
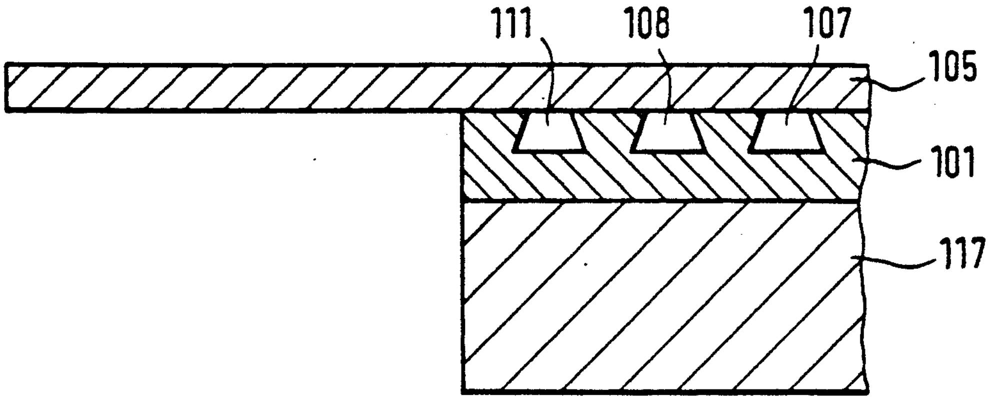
Figure 5:
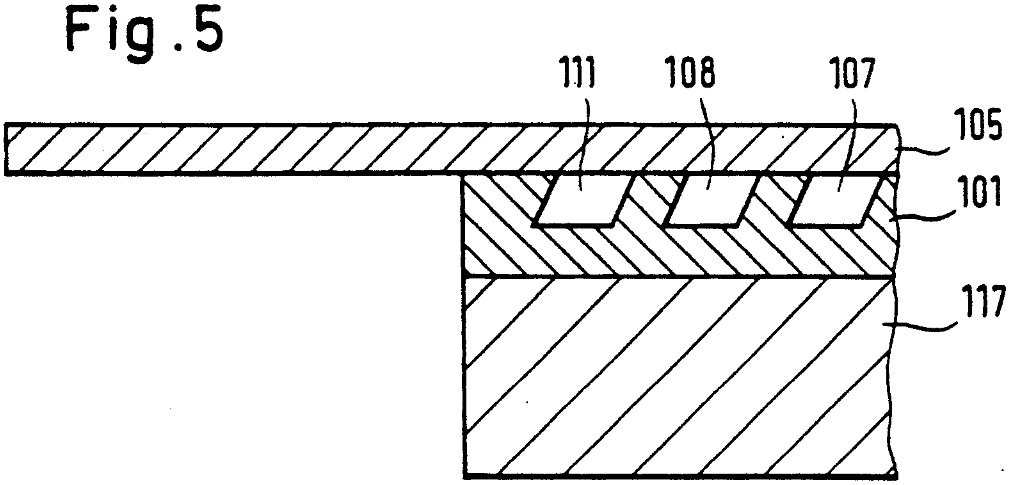
Figure 6:
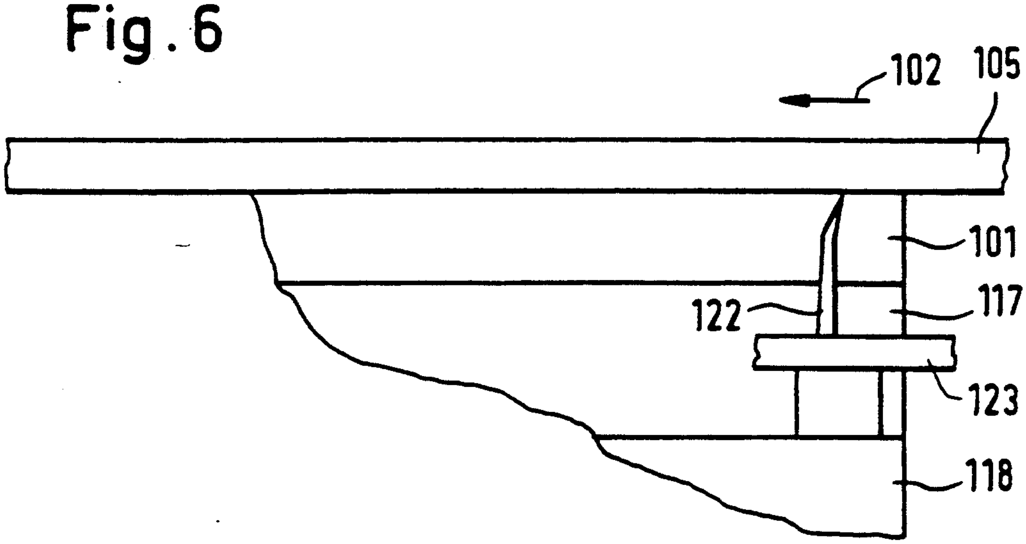

When one or more grooves 107, 108, 111 are of trapezoidal cross-section then they broaden from the top downwardly as shown in FIG. 4. If the cross-section is of parallelogram shape then the flanks extend from the top right to the bottom left as shown in FIG. 5. The above definitions are based on the view of FIG. 3.

I claim:

1. A continuously operating press for pressing a mat by running the mat in a transport direction through the press, the mat having a width and a narrow edge surface parallel to the transport direction, the press comprising:
   - a lower endless press band having a mat supporting side and a lubricated side opposite the mat supporting side;
   - an upper endless press band lying above the lower endless press band positioned so that the mat is pressed between the bands;
   - a slide coating positioned adjacent the lubricated side and having a plurality of grooves positioned in an edge region of the slide coating and extending generally in the transport direction, the edge region being located lateral of the narrow edge surface of the mat when the mat is supported on the lower endless band; and
   - a perpendicular groove oriented generally transverse to the transport direction and extending to a lateral edge of the slide coating to thereby expose the perpendicular groove to outside pressure for reducing the pressure of the lubricant in the edge region.

2. The continuously operating press of claim 1 wherein the plurality of grooves have a breakaway edge and a cross-sectional shape selected from a group consisting of rectangle, trapezoid and parallelogram.

3. The continuously operating press of claim 1 wherein the plurality of grooves further comprise a groove wall, the groove wall being inclined with respect to the slide coating.

4. The continuously operating press of claim 1 wherein the perpendicular groove is connected to one of the plurality of grooves.

5. The continuously operating press of claim 1 wherein the press includes an end region and the plurality of grooves lie transverse to the transport direction in the end region.

6. The continuously operating press of claim 1 further comprising;
   - at least one scraper positioned adjacent the lubricated side near a press band edge for scraping lubricant off of the lubricated side.

* * * * *